US00RE48187E

(19) United States
(12) Reissued Patent
Yokouchi et al.

(10) Patent Number: US RE48,187 E
(45) Date of Reissued Patent: Sep. 1, 2020

(54) GREASE COMPOSITION FOR ROLLING BEARING

(71) Applicants: NSK LTD., Tokyo (JP); KYODO YUSHI CO., LTD., Tokyo (JP)

(72) Inventors: Atsushi Yokouchi, Kanagawa (JP); Jun Kuraishi, Kanagawa (JP); Youichiro Sugimori, Kanagawa (JP); Yasunobu Fujita, Kanagawa (JP); Michiharu Naka, Kanagawa (JP); Atsushi Shibayama, Kanagawa (JP); Hiroshi Kimura, Kanagawa (JP)

(73) Assignees: NSK LTD., Tokyo (JP); KYODO YUSHI CO., LTD., Tokyo (JP)

(21) Appl. No.: 16/198,001

(22) Filed: Nov. 21, 2018

Related U.S. Patent Documents

Reissue of:
(64) Patent No.: 6,482,780
Issued: Nov. 19, 2002
Appl. No.: 09/920,331
Filed: Aug. 2, 2001

(30) Foreign Application Priority Data

Aug. 2, 2000 (JP) ..... 2000-234739

(51) Int. Cl.

| | |
|---|---|
| ***C10M 169/02*** | (2006.01) |
| ***C10M 169/00*** | (2006.01) |
| ***C10N 20/00*** | (2006.01) |
| ***C10N 10/02*** | (2006.01) |
| ***C10N 40/02*** | (2006.01) |
| ***C10N 50/10*** | (2006.01) |

(52) U.S. Cl.
CPC ..... *C10M 169/02* (2013.01); *C10M 169/00* (2013.01); *C10M 2205/0285* (2013.01); *C10M 2207/0406* (2013.01); *C10M 2207/1285* (2013.01); *C10M 2207/2835* (2013.01); *C10N 2010/02* (2013.01); *C10N 2020/063* (2020.05); *C10N 2040/02* (2013.01); *C10N 2050/10* (2013.01)

(58) Field of Classification Search
CPC ..... C10M 169/02; C10M 169/00; C10M 2205/0285; C10M 2207/2835; C10M 2207/0406; C10M 2207/1285; C10N 2210/01; C10N 2250/10; C10N 2240/02; C10N 2220/086
See application file for complete search history.

(56) References Cited

U.S. PATENT DOCUMENTS 5,558,448 A * 9/1996 Yabe et al. ..... 384/470
5,714,444 A 2/1998 Yokouchi et al.
5,840,666 A * 11/1998 Yokouchi et al. ..... 508/107
(Continued)

FOREIGN PATENT DOCUMENTS

JP 8143884 6/1996
JP 08209176 A 8/1996
(Continued)

*Primary Examiner* — Jerry D Johnson
(74) *Attorney, Agent, or Firm* — Sughrue Mion, PLLC

(57) ABSTRACT

A grease composition for rolling bearing comprising a metal soap-based thickening agent containing a long fiber-like material having a major axis length of at least 3 μm incorporated in a base oil comprising a lubricant having a polar group in its molecular structure and a non-polar lubricant blended in combination.

9 Claims, 6 Drawing Sheets

(56) References Cited

U.S. PATENT DOCUMENTS

| | | | | |
|---|---|---|---|---|
| 5,910,470 | A * | 6/1999 | Minami et al. | 508/468 |
| 6,228,813 | B1 * | 5/2001 | Yabe et al. | 508/106 |
| 6,329,326 | B1 * | 12/2001 | Iso et al. | 508/182 |
| 6,339,041 | B1 * | 1/2002 | Aono | 503/226 |
| 6,352,961 | B1 * | 3/2002 | Iso et al. | 508/155 |

FOREIGN PATENT DOCUMENTS

| | | | |
|---|---|---|---|
| JP | 09021424 | A | 1/1997 |
| JP | 09111280 | A | 4/1997 |

* cited by examiner

GREASE COMPOSITION FOR ROLLING BEARING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 6,482,780, which was filed as U.S. application Ser. No. 09/920,331 on Aug. 2, 2001, issued on Nov. 19, 2002, which claims priority to JP 2000-234739, filed Aug. 2, 2000, the disclosures of which are hereby incorporated by reference in their entirety.*

BACKGROUND OF THE INVENTION

The present invention relates to a grease composition to be enclosed in various rolling bearings.

The trend is for more motors for use in fan for air conditioner and HDD spindle to be reduced in its size and output for the purpose of inhibiting the heat generation taking into account the recent environmental restrictions. Therefore, rolling bearings for these purposes have been required to meet sufficient torque characteristics as important characteristics.

The dynamic friction torque of a rolling bearing occurs due to the friction caused by minute slippage on the rolling contact surface, friction by sliding on the sliding contact surface in the bearing or viscosity resistance of grease. Among these factors, the viscosity resistance of grease is known to be affected by the dynamic viscosity of base oil and the viscosity of grease. Accordingly, the dynamic viscosity of base oil is attributed to the shearing resistance of lubricant developed when a fluid lubricant film is formed. Thus, the reduction of this dynamic viscosity is a great solution to the problem of reducing the dynamic friction torque of rolling bearing. Further, since the viscosity of grease has an effect on the channeling properties shown when the bearing is subject to shearing on the interior thereof during rotation, the reduction of the viscosity of grease is another effective solution.

However, when the dynamic viscosity of the base oil is reduced, the desired film thickness can hardly be secured because the fan motor for air conditioner for example may operate at a relatively low speed in an inverter control process. Further, a base oil having a low dynamic viscosity normally has a low heat resistance and thus causes a problem of acoustic durability. On the other hand, the reduction of the viscosity of grease requires the increase of the mixing proportion of a thickening agent, causing a relative reduction of the amount of base oil in the grease. Further, the increase of the mixing proportion of a thickening agent causes the grease to have an enhanced resistance to mechanical shearing. As a result, the amount of base oil supplied onto the lubricated surface of the bearing is reduced, making it impossible to invariably maintain the desired lubricating properties over an extended period of time.

Thus, the reduction of the dynamic viscosity of base oil and the viscosity of grease is limited. For the grease to be enclosed in the rolling bearing for the foregoing purpose, it is said preferred that the dynamic viscosity of base oil be from 10 to 500 $mm^2/s$ (40° C.), the viscosity of grease be in NLGI No. 2-3 grade, and the amount of thickening agent be from 5 to 20% by mass.

Under these circumstances, a grease having a lithium salt of aliphatic acid incorporated as a thickening agent in an ester oil as a base oil is enclosed in a motor having requirements for acoustic characteristics in particular. This is because an ester oil has a higher heat resistance than a mineral oil and has a polar group in its molecular structure. This polar group causes the mineral oil to enhance its adsorptivity to the surface of metal, improving the friction characteristics and hence the acoustic durability.

As mentioned above, although some effective methods for improving acoustic durability have been found, no grease compositions effective for the reduction of bearing torque were obtained.

SUMMARY OF THE INVENTION

The present invention has been worked out under these circumstances. An object of the present invention is to provide a grease composition which exhibits an excellent acoustic durability and can attain the reduction of bearing torque.

The inventors made extensive studies of accomplishment of the foregoing object of the present invention. As a result, a thickening agent having a specific shape and a base oil to be combined therewith were found. Thus, the present invention has been worked out.

In other words, the foregoing object of the present invention is accomplished with a grease composition for rolling bearing comprising a metal soap-based thickening agent containing a long fiber-shaped material having a major axis length of at least 3 μm incorporated in a base oil comprising a lubricant having a polar group in its molecular structure and a non-polar lubricant blended in combination, *wherein the lubricant having a polar group in its molecular structure and the non-polar lubricant are incorporated in the base oil in such an amount that the content of the lubricant having a polar group in its molecular structure accounts for from 15% to 40% by mass of the total amount of said base oil, and the content of the non-polar lubricant accounts for from 60% to 85% by mass of the total amount of said base oil.*

DETAILED DESCRIPTION OF THE PREFERRED EMBODIMENTS

Figure 1B:
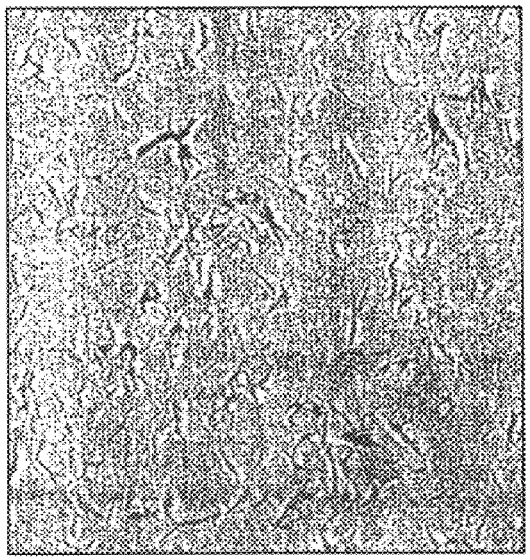
FIG. 1B depicts a schematic electron microphotograph of the grease composition obtained in Comparative Example 1.

The present invention will be further described hereinafter in connection with the attached drawings.

The base oil of the grease composition of the invention is a mixture of a lubricant having a polar group in its molecular structure (hereinafter referred to as "polar group-containing lubricant") and a non-polar lubricant. As the polar group-containing lubricant there is preferably used a lubricant having an ester structure or lubricant having an ether structure.

The lubricant having an ester structure is not specifically limited. Preferred examples of the lubricant having an ester structure employable herein include diester oil obtained by the reaction of dibasic acid with branched alcohol, carbonic acid ester oil, aromatic ester oil obtained by the reaction of aromatic tribasic acid with branched alcohol, and polyol ester oil obtained by the reaction of monobasic acid with polyvalent alcohol. These lubricants may be used singly or in combination of two or more thereof. Specific preferred examples of these lubricants will be given below.

Examples of the diester oil employable herein include dioctyl adipate (DOA), diisobutyl adipate (DIBA), dibutyl adipate (DBA), dioctyl adipate (DOZ), dibutyl sebacate (DBS), dioctyl sebacate (DOS), and methyl acetyl ricinolate (MAR-N)

Examples of aromatic ester oil include trioctyl trimellitate (TOTM), tridecyl trimellitate, and tetraoctyl pyromellitate.

Examples of the polyol ester oil employable herein include those obtained by proper reaction of the following polyvalent alcohol with the following monobasic acid. The polyvalent alcohol may be reacted with a single monobasic acid or a plurality of monobasic acids. Further examples of the polyol ester oil employable herein include complex ester which is an oligo ester of polyvalent alcohol with mixture of dibasic acid and monobasic acid. Examples of the polyvalent alcohol employable herein include trimethylol propane (TMP), pentaerythritol (PE), dipentaerythritol (DPE), neopentyl glycol (NPG), and 2-methyl-2-propyl-1,3-propanediol (MPPD). As the monobasic acid there may be mainly used a $C_4$-$C_{16}$ monobasic aliphatic acid. Specific examples of the monobasic acid employable herein include butyric acid, valeric acid, caproic acid, caprylic acid, enanthic acid, pelargonic acid, capric acid, undecanoic acid, lauric acid, mysteric acid, palmitic acid, tallow acid, stearic acid, caproleic acid, palmitoleic acid, petroceric acid, oleic acid, elaidic acid, ascrepic acid, vaccenic acid, sorbic acid, linoleic acid, linolenic acid, abinic acid, and ricinoleic acid.

As the carbonic acid ester oil there is preferably used a $C_6$-$C_{30}$ straight-chain or branched alkyl group.

Examples of the lubricant having an ether structure include (di)alkyl diphenyl ether oil, (di)alkyl polyphenyl ether oil, and polyalkylene glycol oil.

The foregoing polar group-containing lubricants may be used singly or in combination of two or more thereof. Preferred among these polar group-containing lubricants are polyol ester oil and aromatic ester oil taking into account the torque characteristics and acoustic durability.

On the other hand, as the non-polar lubricant there may be used a mineral oil, synthetic hydrocarbon oil or mixture thereof. Specific examples of the mineral oil employable herein include paraffinic mineral oil, and naphthenic mineral oil. Specific examples of the synthetic hydrocarbon oil employable herein include poly-α-olefin oil. Preferred among these non-polar lubricants is synthetic hydrocarbon taking into account acoustic durability.

The lubricant having a polar group in its molecular structure and the non-polar lubricant are incorporated in the base oil in such an amount that the content of the lubricant having a polar group in its molecular structure accounts for from 5% to 70%, particularly 10% to 70% by mass of the total amount of the base oil. When the content of the polar group-containing lubricant falls below 5% by mass, the resulting lubricant composition leaves something to be desired in improvement of acoustic durability and reduction of torque. As described later, in order to prepare the grease composition of the invention, a metal soap-based thickening agent containing a long fiber-like material is previously synthesized in a non-polar lubricant. The metal soap-based thickening agent is then dissolved in the non-polar lubricant to prepare a gel which is then mixed with a polar group-containing lubricant. Accordingly, when the content of the polar group-containing lubricant exceeds 70% by mass, the amount of the non-polar lubricant is so small that the synthesis of the metal soap-based thickening agent is adversely affected.

The dynamic viscosity of the base oil comprising a polar group-lubricant and a non-polar lubricant in combination may fall within the range of from 25 to 200 $mm^2/s$ (40° C.) as in the conventional base oil. In order to facilitate the foregoing preparation process, as the polar group-containing lubricant there is preferably used one having a dynamic viscosity of from 2,000 to 100,000 $mm^2/s$ (40° C.).

The thickening agent to be incorporated in the grease composition of the invention is a metal soap containing a long fiber-like material having a major axis length of at least 3 μm. A particularly preferred examples of the metal soap is an organic aliphatic acid metal salt or organic hydroxyaliphatic acid metal salt synthesized from monovalent and/or divalent organic aliphatic acid or organic hydroxyaliphatic acid and metal hydroxide. The organic aliphatic acid employable herein is not specifically limited. In practice, however, there may be used lauric acid ($C_{12}$), myristic acid ($C_{14}$), palmitic acid ($C_{16}$), margaric acid ($C_{17}$), stearic acid ($C_{18}$), arachidic acid ($C_{20}$), behenic acid ($C_{22}$), lignoceric acid ($C_{24}$), tallow acid, etc. Examples of the organic hydroxyaliphatic acid employable herein include 9-hydroxystearic acid, 10-hydroxystearic acid, 12-hydroxystearic acid, 9,10-dihydroxystearic acid, ricinolic acid, and ricinoelaidic acid. On the other hand, examples of the metal hydroxide employable herein include hydroxide of aluminum, barium, calcium, lithium and sodium.

The foregoing organic aliphatic acid or organic hydroxyaliphatic acid and the metal hydroxide to be used in combination are not specifically limited. Stearic acid, tallow acid or hydroxystearic acid (particularly 12-hydroxystearic acid) and lithium hydroxide are preferably used in combination from the standpoint of excellence in bearing performance. If necessary, a plurality of organic aliphatic acids or organic hydroxyaliphatic acids and metal hydroxides may be used.

In order to obtain a metal soap-based thickening agent containing a long fiber-like material having a major axis length of at least 3 μm, the foregoing organic aliphatic acid or organic hydroxyaliphatic acid and the metal hydroxide are reacted in a non-polar lubricant which is a base oil. The conditions under which the long fiber-like material is produced are not specifically limited. By way of example, the following preparation method may be used.

In some detail, a hydroxystearic acid is dissolved in a synthetic hydrocarbon oil and reacted with lithium hydroxide to prepare a lithium soap. Subsequently, this lithium soap is heated to a temperature of not lower than 210° C., and then dissolved in a base oil. After cooled, the solution is kept at a temperature of 200° C. for about 60 minutes. Thereafter, the solution is slowly cooled to a temperature of 140° C. at a rate of 1° C./min. When the temperature of the solution reaches 140° C., a base which has been heated to a temperature of 140° C. is then added to the solution. The solution is then subjected to processing over a three-stage roll mill to obtain the desired grease containing a long fiber-like thickening agent. The amount of the thickening agent may be from 5 to 20% by mass as in the conventional grease composition. Thus, the mixing proportion of the organic aliphatic acid or hydroxyaliphatic acid and the metal oxide is properly predetermined.

The metal soap thus obtained contains a long fiber-like material having a major axis length of not smaller than 3 μm. The proportion of the long fiber-like material is preferably not smaller than 30% by mass based on the total amount of the thickening agent. The major axis length of the long fiber-like material is preferably not smaller than 3 μm. However, when the major axis length of the long fiber-like material is too long, there occurs much vibration developed when the long fiber-like material gets on the contact surface of the rolling bearing during rotation, adversely affecting the initial acoustic characteristics. Thus, the upper limit of major axis length is preferably 10 μm. The minor axis length of the long fiber-like material is not specifically limited but is less than 1 μm. The proportion of the long fiber-like material and the major axis length and minor axis length of the long fiber-like material can be controlled by properly predetermining the foregoing reaction conditions.

In order to measure the major axis length and minor axis length of the metal soap-based thickening agent thus synthesized, the foregoing dispersion is diluted with a solvent such as hexane. The dispersion is then attached to a copper mesh having a collodion film applied thereto. The specimen may be observed at a magnification of from about 6,000 to 20,000 under a transmission electron microscope.

Figure 1A:
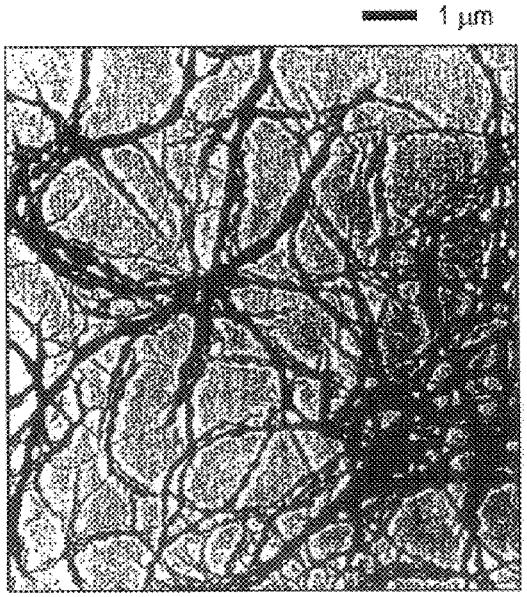
FIG. 1A depict a schematic electron microphotograph of the grease composition obtained in Example 1.

The foregoing dispersion is then cooled to about room temperature to undergo gelation. The gel thus obtained is then kneaded with a polar group-containing lubricant to obtain the grease composition of the invention. FIG. 1A illustrates an electron microphotograph (×6,000) of the grease composition of the invention obtained in Example 1 below. FIG. 1B illustrates an electron microphotograph (×6,000) of the conventional composition (B) in Comparative Example 2 below. It can be seen in these figures that the length of fibers in the thickening agent contained in the grease composition shown in FIG. 1A is drastically longer than that of the conventional grease composition (B).

The grease composition of the invention may comprise the following conventional known additives incorporated therein as necessary. The incorporation of these additives in the grease composition can be accomplished by adding these additives to the polar group-containing lubricant during the foregoing preparation process, and then kneading the mixture with the gel.

[Oxidation Inhibitor]

As the oxidation inhibitor there may be properly selected from the group consisting of age resistor to be incorporated in rubber, plastic, lubricant, etc., ozone deterioration inhibitor, and oxidation inhibitor. Examples of the oxidation inhibitor employable herein include amine compounds such as phenyl-1-naphthylamine, phenyl-2-naphthylamine, diphenyl-p-phenylenediamine, dipyridylamine, phenothiazine, N-methylphenothiazine, N-ethylphenothiazine, 3,7-dioctylphenothiazine, p,p'-dioctyldiphenylamine, N,N'-diisopropyl-p-phenylenediamine and N,N'-di-sec-butyl-p-phenylenediamine, and phenol compounds such as 2,6-di-tert-dibutylphenol.

[Rust Preventive/Metal Inactivator]

Examples of the rust preventive employable herein include ammonium salt of organic sulfonic acid, salt of alkaline metal or alkaline earth metal such as barium, zinc, calcium and magnesium with organic sulfonic acid or organic carboxylic acid, phenate, phosphonate, alkyl or alkenyl succinic acid derivative such as alkyl and alkenyl succinic acid ester, partial ester of polyvalent alcohol such as sorbitan monoolate, hydroxyaliphatic acid such as oleoyl sarcosine, mercaptoaliphatic acid such as 1-mercaptostearic, metal salt thereof, higher aliphatic acid such as stearic acid, higher alcohol such as isostearyl alcohol, ester of higher alcohol with higher aliphatic acid, thiazole such as 2,5-dimercapto-1,3,4-thiadiazole and 2-mercaptothiadiazole, imidazole compound such as 2-(decyldithio)benzoimidazole and benzimidazole, disulfide compound such as 2,5-bis(dodecyldithio)benzimidazole, phosphoric acid ester such as trisnonylphenylphosphite, and thiocarboxylic acid ester compound such as dilauryl thiopropionate. Further, nitrite may be used.

As the metal inactivator there may be used a triazole compound such as benzotriazole and tolyl triazole.

[Oil Agent]

Examples of the oil agent employable herein include aliphatic acid such as oleic acid and stearic acid, aliphatic acid alcohol such as oleyl alcohol, aliphatic acid ester such as polyoxyethylenestearic acid ester and polyglyceryloleic acid ester, phosphoric acid, and phosphoric acid ester such as tricresyl phosphate, lauric acid ester and polyoxyethylene oleyl ether phosphoric acid.

The torque reducing effect of the grease composition of the invention thus prepared is presumably attributed to the following mechanism.

In other words, the grease composition of the invention comprises a long fiber-like material having a major axis length of not smaller than 3 μm incorporated therein as a thickening agent. The shearing developed when the bearing rotates causes the long fiber-like material to exhibit orientation and hence reduce the bearing torque. This effect becomes more remarkable depending on the non-polar lubricant used in combination. Further, the base oil comprises a polar group-containing lubricant incorporated therein. This polar group-containing lubricant acts similar to the conventional base oil having a polar group (e.g., ester oil). Thus, the polar group-containing lubricant is preferentially adsorbed by the contact surface of the rotary portion of the bearing to form an adsorption film that improves the friction characteristics and hence reduce the bearing torque. Further, the polar group in the polar group-containing lubricant undergoes mutual interaction with the micellar structure of the metal soap to weaken the bond strength between long fiber-like materials and hence lower the shearing resistance of the grease during the rotation of the bearing and further reduce the bearing torque.

EXAMPLE

The present invention will be further described in the following examples.

Example 1

78 g of 12-hydroxystearic acid and 6.2 g of lithium hydroxide were reacted in 552 g of a poly-α-olefin to produce 80 g of a lithium soap. The lithium soap thus produced was then allowed to cool to room temperature to prepare a gel. The gel thus prepared and 368 g of a polyol ester were then kneaded to prepare a grease composition. The grease composition thus prepared was diluted with hexane, and then attached to a copper mesh having a collodion film applied thereto. The specimen was then observed under transmission electron microscope. As shown in FIG. 1A, a long fiber-like material having a major axis length of not smaller than 3 μm was observed.

Example 2

168 g of stearic acid and 14.2 g of lithium hydroxide were reacted in 705 g of a poly-α-olefin to produce 170 g of a lithium soap. The lithium soap thus produced was then allowed to cool to room temperature to prepare a gel. The gel thus prepared and 125 g of a polyol ester were then kneaded to prepare a grease composition. The grease composition thus prepared was then observed under transmission electron microscope in the same manner as in Example 1. As a result, a long fiber-like material having a major axis length of not smaller than 3 μm was observed.

Example 3

116 g of stearic acid and 9.8 g of lithium hydroxide were reacted in 528 g of a poly-α-olefin to produce 120 g of a lithium soap. The lithium soap thus produced was then allowed to cool to room temperature to prepare a gel. The gel thus prepared and a mixture of 26 g of a polyol ester and 106 g of diphenyl ether were then kneaded to prepare a grease composition. The grease composition thus prepared was then observed under transmission electron microscope in the same manner as in Example 1. As a result, a long fiber-like material having a major axis length of not smaller than 3 μm was observed.

Comparative Example 1

116 g of stearic acid and 9.8 g of lithium hydroxide were reacted in 880 g of a poly-α-olefin to produce 120 g of a lithium soap. The lithium soap thus produced was then allowed to cool to room temperature to prepare a grease composition. The grease composition thus prepared was then observed under transmission electron microscope in the same manner as in Example 1. As a result, a long fiber-like material having a major axis length of not smaller than 3 μm was observed.

Comparative Example 2

97 g of 12-hydroxystearic acid and 7.9 g of lithium hydroxide were reacted in 900 g of a poly-α-olefin to produce 100 g of a lithium soap. The lithium soap thus produced was then allowed to cool to room temperature to prepare a grease composition. The grease composition thus prepared was then observed under transmission electron microscope in the same manner as in Example 1. As shown in FIG. 1B, nothing was found but short fiber-like material.

Comparative Example 3

136 g of stearic acid and 11.5 g of lithium hydroxide were reacted in 860 g of a poly-α-olefin to produce 140 g of a lithium soap. The lithium soap thus produced was then allowed to cool to room temperature to prepare a grease composition. The grease composition thus prepared was then observed under transmission electron microscope in the same manner as in Example 1. As a result, a long fiber-like material having a major axis length of not smaller than 3 μm was observed.

Comparative Example 4

130 g of stearic acid and 10.8 g of lithium hydroxide were reacted in 870 g of a polyol ester to produce 130 g of a lithium soap. The lithium soap thus produced was then allowed to cool to room temperature to prepare a grease composition. The grease composition thus prepared was then observed under transmission electron microscope in the same manner as in Example 1. As a result, nothing was found but short fiber-like material.

The various components incorporated in the foregoing examples and comparative examples and the physical properties (dynamic viscosity of base oil, mixed viscosity, fibrous structure of thickening agent) of the grease composition thus obtained are set forth in Table 1.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Thickening agent | Lithium soap | Lithium soap | Lithium soap | Lithium soap | Lithium soap | Lithium soap | Lithium soap |
| Amount of thickening agent[1)] | 8 | 17 | 12 | 12 | 10 | 14 | 13 |
| Formulation of base oil[2)] | Poly-α-olefin (60) Polyol ester (40) | Poly-α-olefin (85) Polyol ester (15) | Poly-α-olefin (60) Polyol ester (3) Alkyl diphenyl ether (12) | Poly-α-olefin (100) | Polyol ester (100) | Poly-α-olefin (100) | Polyol ester (100) |
| Dynamic Viscosity of base oil[3)] | 129 | 54 | 56 | 130 | 117 | 30 | 53 |
| Mixed viscosity | 285 | 217 | 283 | 277 | 276 | 240 | 239 |
| Fibrous structure | Long fiber-like material contained | Long fiber-like material contained | Long fiber-like material contained | Long fiber-like material contained | Only short fiber-like material | Long fiber-like material contained | Only short fiber-like material |

[1)]% by mass
[2)]The figure in patenthesis indicates % by mass.
[3)]$mm^2/s$ (40° C.)

(Experiment 1: High Speed Rotary Torque Test)

Figure 2:
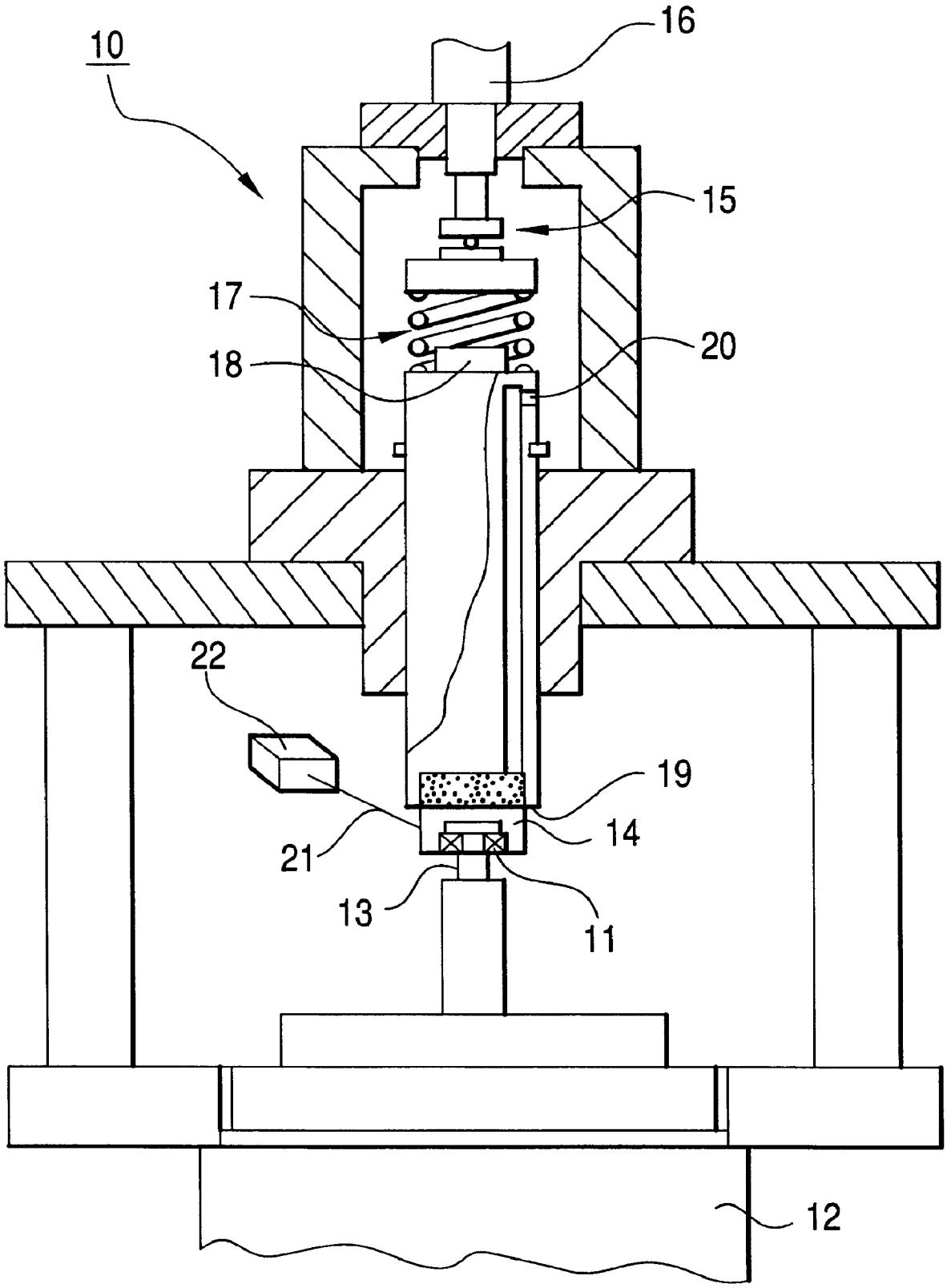
FIG. 2 is a schematic diagram illustrating the measuring instrument used to conduct a high speed rotary torque test in the examples.

In order to examine the bearing torque reducing effect of grease composition, high speed rotary torque test was conducted using a measuring apparatus 10 shown in FIG. 2. In the measuring apparatus 10, a test bearing 11 is mounted on a shaft 13 connected to an air spindle 12. On the test bearing 11 is mounted an outer ring cover 14 made of aluminum. A load developed by an axial load cell 15 is applied to the test bearing 11 via the outer ring cover 14. The axial load cell 15 is adjusted by a micrometer head 16 for axial load to give a proper load that presses a cell main body 18 on which a spring 17 is mounted. The cell main body 18 also has an air bearing 19 attached thereto on the outer ring cover side thereof. In this arrangement, air supplied through an air inlet 20 supports the rotation of the outer ring cover 14, i.e., test bearing 11. The outer ring cover 14 is connected to a load cell 22 via a thread 21 to measure the torque developed by the rotation of the test bearing 11.

Figure 3:
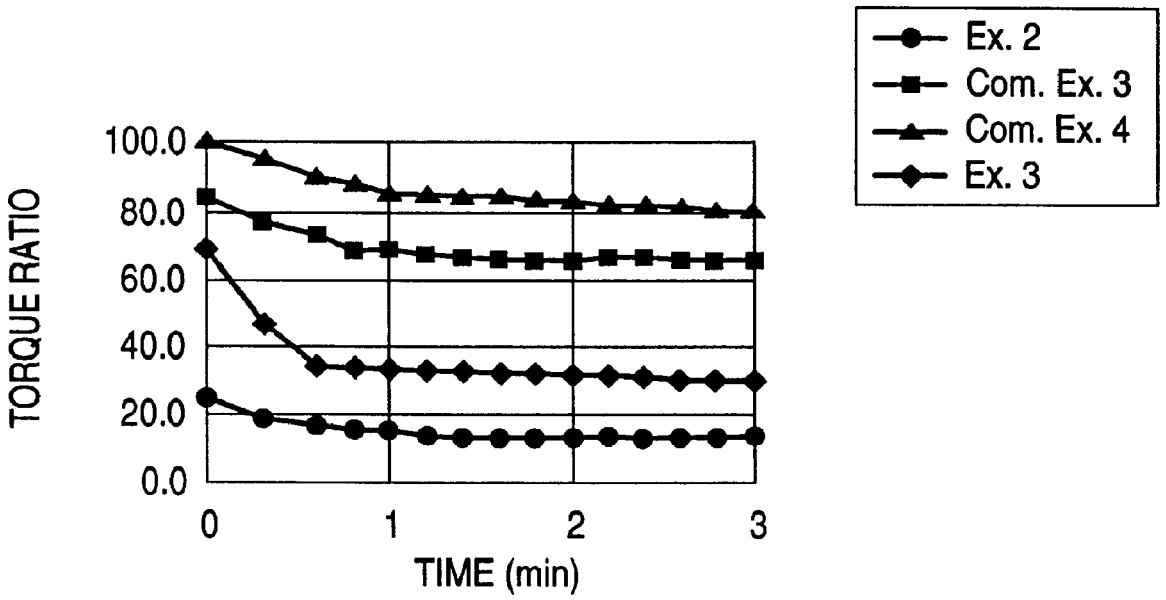
FIG. 3 is a graph illustrating the results of high speed rotary torque test conducted in the examples.

For test, a rolling bearing with non-contacting rubber seal having an inner diameter ϕ of 5, an outer diameter ϕ of 13 and a width of 4 provided with a plastic retainer was used as a test bearing 11. The grease compositions of Examples 2 and 3 and Comparative Examples 3 and 4 were each enclosed in the rolling bearing in an amount of 10 mg. The outer ring was then rotated at a rotary speed of 151,000 rpm and an axial load of 14.7 N to measure torque. The measurement was conducted for 3 minutes after the initiation of rotation. The results are shown in FIG. 3. It was confirmed that the enclosure of the grease compositions of Examples 2 and 3 makes it possible to drastically reduce the bearing torque as shown in FIG. 3.

(Experiment 2: Low Speed Rotary Torque Test)

Figure 4:
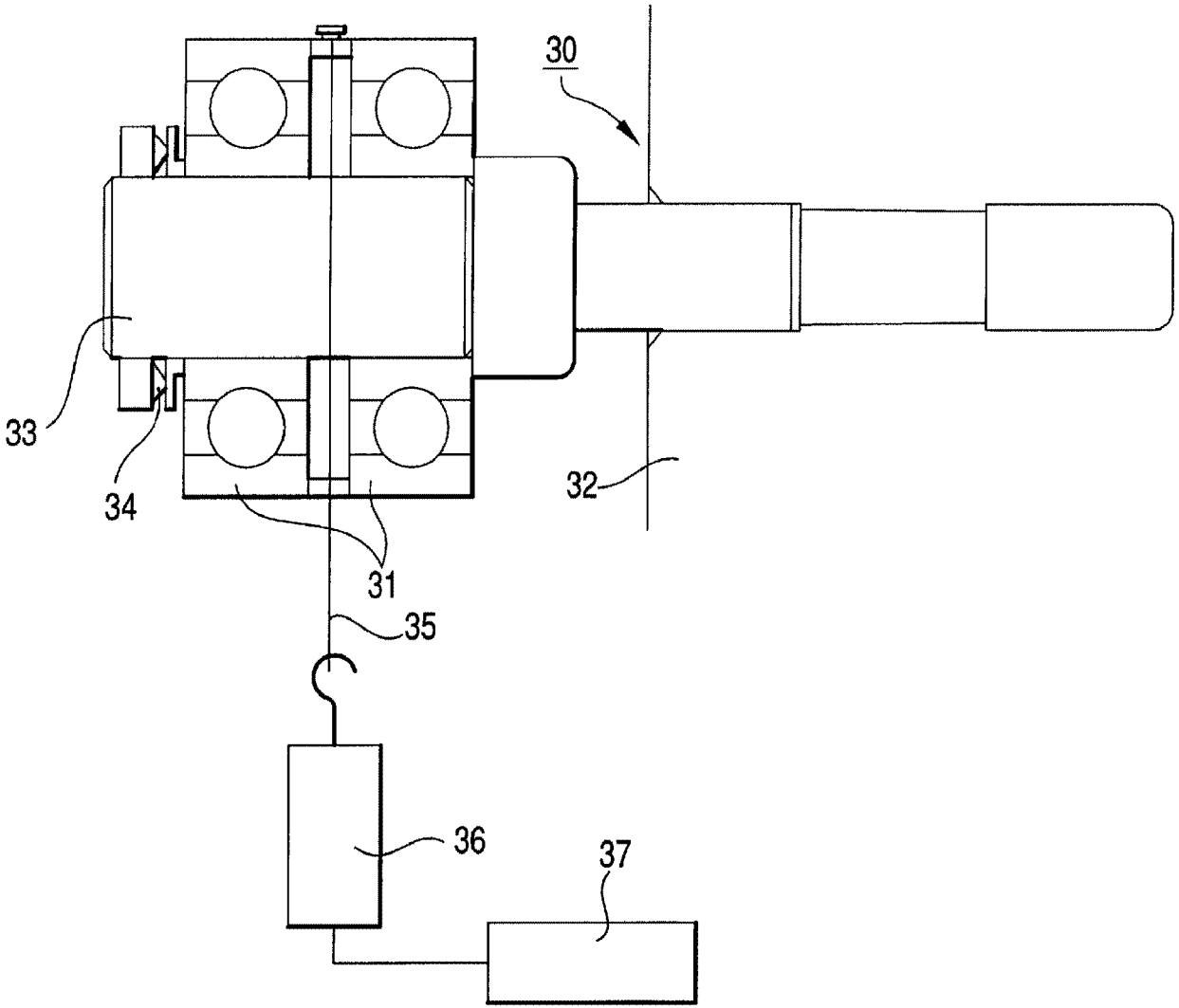
FIG. 4 is a schematic diagram illustrating the measuring instrument used to conduct a low speed rotary torque test in the examples.

A low speed rotary toque test was conducted using a measuring apparatus 30 shown in FIG. 4. In the measuring apparatus 30, a pair of test bearings 31 are mounted on a shaft 33 connected to an air spindle 32 via a pilot pressure wave washer 34. The test bearing 31 is horizontally positioned with the air spindle 32. A load converter 36 is suspended from the test bearing 31 via a thread 35. The output of the load converter 36 is recorded on an X-Y recorder 37.

Figure 5:
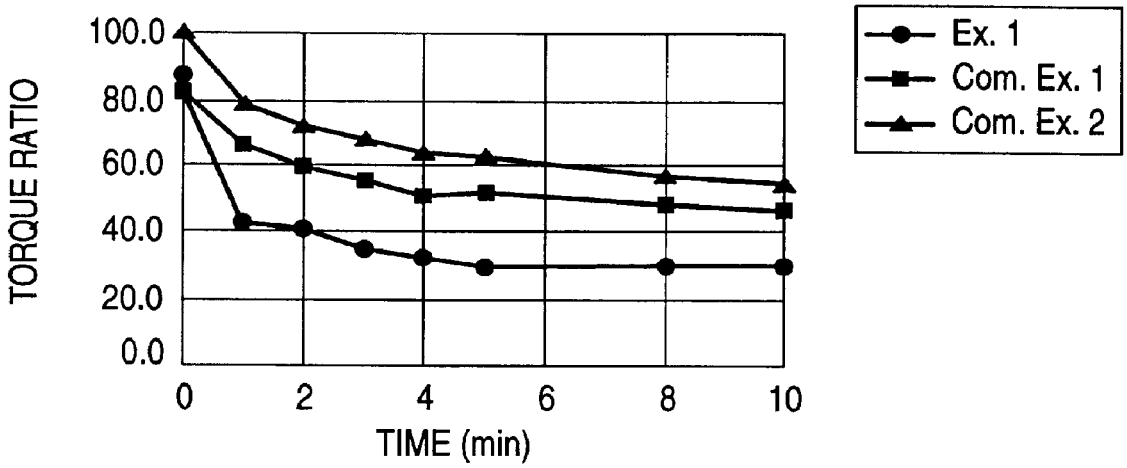
FIG. 5 is a graph illustrating the results of low speed rotary torque test conducted in the examples.

For test, a rolling bearing with non-contacting rubber seal having an inner diameter ϕ of 15, an outer diameter ϕ of 35 and a width of 11 provided with an iron retainer was used as a test bearing 31. The grease compositions of Example 1 and Comparative Examples 1 and 2 were each enclosed in the test bearing 31 in an amount of 0.7 g. The inner ring was then rotated at a rotary speed of 14,000 rpm and an axial load of 39.2 N to measure torque. The measurement was conducted for 10 minutes after the initiation of rotation. The results are shown in FIG. 5. It was confirmed that the enclosure of the grease composition of Example 1 makes it possible to drastically reduce the bearing torque as shown in FIG. 5.

(Experiment 3: Examination of Mixing Proportion of Polar Group-containing Lubricant)

Figure 6:
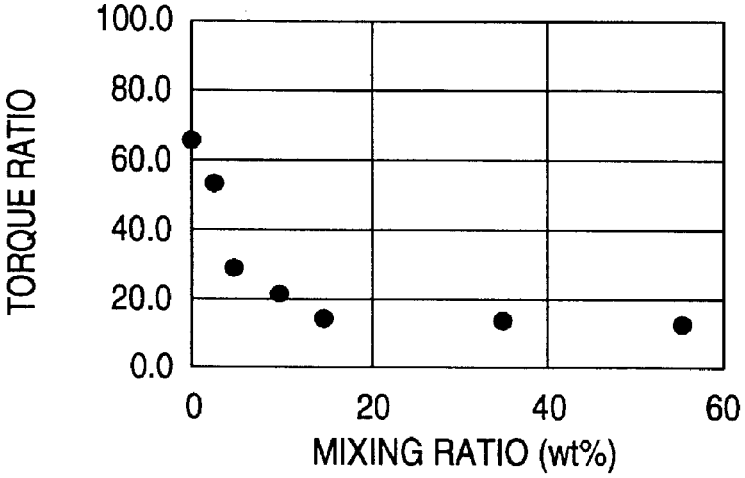
FIG. 6 is a graph illustrating the relationship between the mixing proportion of lubricant containing polar group and the bearing torque determined in the examples.

Grease compositions having different mixing proportions of polyol ester were prepared according to Example 2. These grease compositions were then subjected to high speed rotary torque test according to Experiment 1. The measurement of torque was conducted when 3 minutes passed after the initiation of rotation. The results are set forth in FIG. 6. As can be seen in these results, the incorporation of polyol ester in an amount of not smaller than 5% by mass, particularly not smaller than 10% by mass, makes it possible to obtain extremely good torque characteristics.

(Experiment 4: Examination of Dynamic Viscosity of Base Oil)

Figure 7:
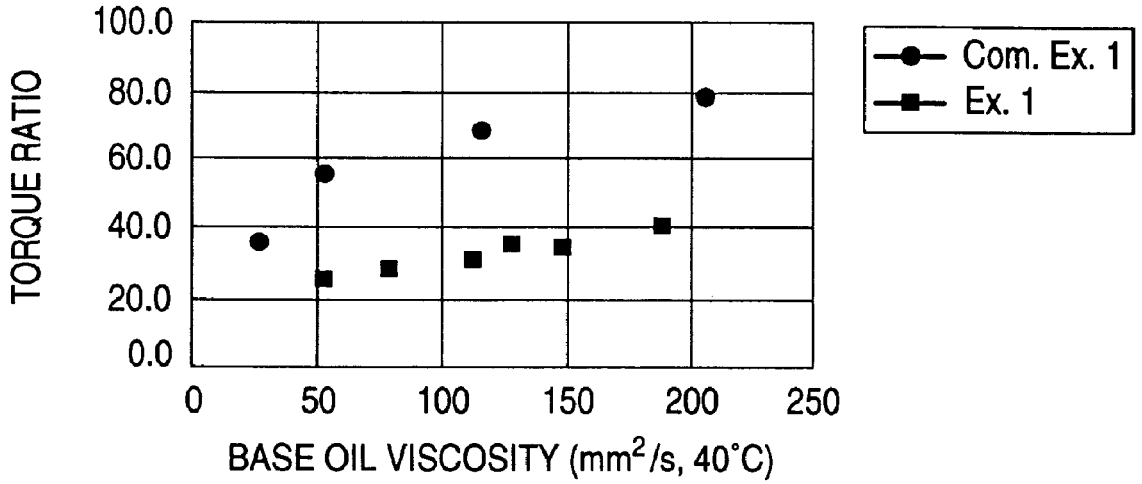
FIG. 7 is a graph illustrating the relationship between the dynamic viscosity of base oil and the bearing torque determined in the examples.

Grease compositions having different dynamic viscosities of base oil were prepared according to Example 1 and Comparative Example 1. These grease compositions were then subjected to low speed rotary torque test according to Experiment 2. The measurement of torque was conducted when 3 minutes passed after the initiation of rotation. The results are set forth in FIG. 7. As can be seen in these results, the grease composition according to Example 1 exhibits a low bearing torque all over the predetermined range of dynamic viscosity of base oil (50 to 200 $mm^2/s$, 40° C.). and thus can provide extremely good torque characteristics.

(Experiment 5: Examination of Mixing Proportion of Long Fiber-like Material in Thickening Agent)

Figure 8:
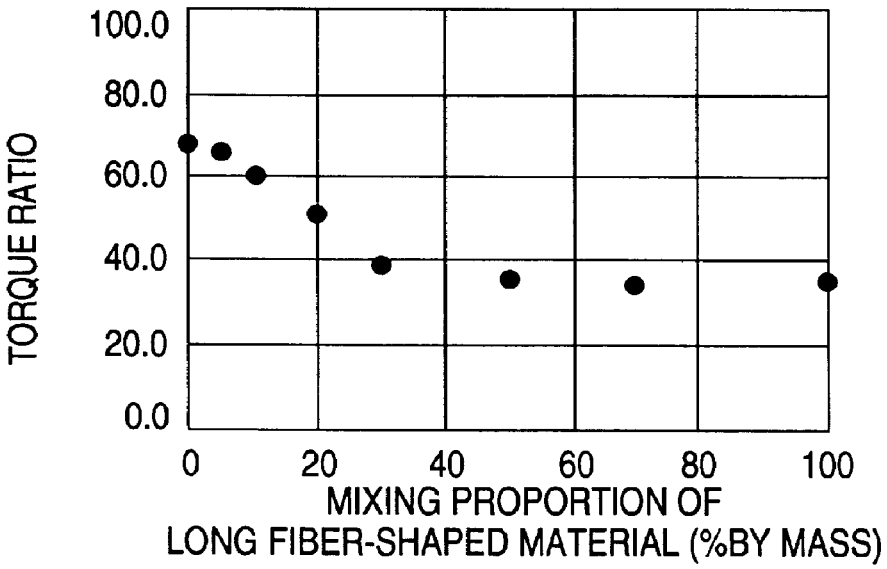
FIG. 8 is a graph illustrating the relationship between the mixing proportion of long fiber-like material in thickening agent and the bearing torque determined in the examples.

Grease compositions having different mixing proportions of long fiber-like material in lithium soap were prepared according to Example 1. These grease compositions were then subjected to low speed rotary torque test according to Experiment 2. The measurement of torque was conducted when 3 minutes passed after the initiation of rotation. The results are set forth in FIG. 8. As can be seen in these results, when the mixing proportion of long fiber-like material is not smaller than 30% by mass, the bearing torque can be lowered to a low value.

As mentioned above, the present invention can provide a grease composition which exhibits an excellent acoustic durability and can reduce the bearing torque.

What is claimed is:

1. A grease composition for rolling bearing comprising: a metal soap-based thickening agent containing a long fiber-like material having a major axis length of at least 3 μm incorporated in a base oil comprising a lubricant having a polar group in its molecular structure and a non-polar lubricant blended in combination,

*wherein the lubricant having a polar group in its molecular structure and the non-polar lubricant are incorporated in the base oil in such an amount that the content of the lubricant having a polar group in its molecular structure accounts for from 15% to 40% by mass of the total amount of said base oil, and the content of the non-polar lubricant accounts for from 60% to 85% by mass of the total amount of said base oil.*

2. The grease composition for rolling bearing as defined in claim 1, wherein the maximum major axis length of said long fiber-shaped material is not greater than 10 μm.

3. The grease composition for rolling bearing as defined in claim 2, wherein the minor axis length of said long fiber-like material is less than 1 μm.

[4. The grease composition for rolling bearing as defined in claim 1, wherein the content of said long fiber-like material accounts for not smaller than 30% by mass of the total amount of said metal soap-based thickening agent.]

5. The grease composition for rolling bearing as defined in claim 1, wherein said lubricant having a polar group in its molecular structure is one having an ester structure or ether structure.

6. The grease composition for rolling bearing as defined in claim 5, wherein said lubricant having a polar group in its molecular structure is a polyol ester oil or aromatic ester oil.

7. The grease composition for rolling bearing as defined in claim 1, wherein said non-polar lubricant is a mineral oil, synthetic hydrocarbon oil or mixture thereof.

8. The grease composition for rolling bearing as defined in claim 7, wherein said mineral oil is a paraffinic mineral oil or naphthenic mineral oil.

9. The grease composition for rolling bearing as defined in claim 7, wherein said synthetic hydrocarbon oil is a poly-α-olefin oil.

[10. The grease composition for rolling bearing as defined in claim 1, wherein said lubricant having a polar group in its molecular structure and said non-polar lubricant are incorporated in said base oil in such an amount that the content of said lubricant having a polar group in its molecular structure accounts for from 5% to 70% by mass of the total amount of said base oil.]

[11. The grease composition for rolling bearing as defined in claim 10, wherein said lubricant having a polar group in its molecular structure is incorporated in said base oil in such an amount that the content of said lubricant having a polar group in its molecular structure accounts for from 10% to 70% by mass of the total amount of said base oil comprising said lubricant having a polar group in its molecular structure and said non-polar lubricant incorporated in combination.]

12. The grease composition for rolling bearing as defined in claim 1, wherein the dynamic viscosity of said lubricant having a polar group in its molecular structure is from 2,000 to 100,000 $mm^2/s$ (40° C.).

* * * * *